(12) United States Patent
Yu et al.

(10) Patent No.: US 8,622,628 B2
(45) Date of Patent: Jan. 7, 2014

(54) OPTICAL FIBER CONNECTOR HAVING V-SHAPED RECEIVING GROOVES

(75) Inventors: Tai-Cherng Yu, New Taipei (TW); Kun-Chan Wu, New Taipei (TW); Chia-Ling Hsu, New Taipei (TW); Cheng-Sheng Shih, New Taipei (TW); I-Thun Lin, New Taipei (TW); Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 221 days.

(21) Appl. No.: 13/278,115

(22) Filed: Oct. 20, 2011

(65) Prior Publication Data

US 2013/0051732 A1 Feb. 28, 2013

(30) Foreign Application Priority Data

Aug. 23, 2011 (TW) .............................. 100130203 A

(51) Int. Cl.
*G02B 6/36* (2006.01)
*G02B 6/38* (2006.01)
*G02B 6/00* (2006.01)

(52) U.S. Cl.
USPC ............................................. 385/74; 385/88

(58) Field of Classification Search
USPC .................................... 385/75–85, 88–92, 147
See application file for complete search history.

(56) References Cited

U.S. PATENT DOCUMENTS

| 4,433,898 A * | 2/1984 | Nasiri ............................. 385/91 |
| 8,360,659 B2 * | 1/2013 | Krahenbuhl et al. ........... 385/53 |
| 8,430,576 B2 * | 4/2013 | Ko .................................. 385/77 |
| 2007/0237459 A1 * | 10/2007 | Watte et al. ..................... 385/39 |

\* cited by examiner

*Primary Examiner* — Akm Enayet Ullah
(74) *Attorney, Agent, or Firm* — Altis Law Group, Inc.

(57) ABSTRACT

An optical fiber connector includes optical fibers, a connector body, and a cover. The connector body includes optical lenses arranged at the first side surface. The connector body defines receiving grooves. Each of the receiving grooves has a V-shaped section and two slanted surfaces. The optical fibers are received in the grooves and as a result are correctly aligned with the respective optical lenses. The cover and the slanted surfaces of the receiving grooves cooperatively securely retain the optical fibers in the connector.

7 Claims, 5 Drawing Sheets

OPTICAL FIBER CONNECTOR HAVING V-SHAPED RECEIVING GROOVES

BACKGROUND

1. Technical Field

The present disclosure relates to optics and, particularly, to an optical fiber connector.

2. Description of Related Art

Many optical fiber connectors include a lens and a blind hole behind the lens. The bind hole receives an optical fiber. The lens receives and guides light from/to the optical fiber.

Injection molding is a popular method of fabricating optical fiber connectors. The mold used includes a core pin to form the blind hole. During the injection molding process, however, the core pin may be bent by impact or by the pressure of the introduced molding material, thus producing a blind hole which is misaligned or otherwise out of specification.

Therefore, it is desirable to provide an optical fiber connector, which can overcome or at least alleviate the limitations described.

DETAILED DESCRIPTION

Figure 1:
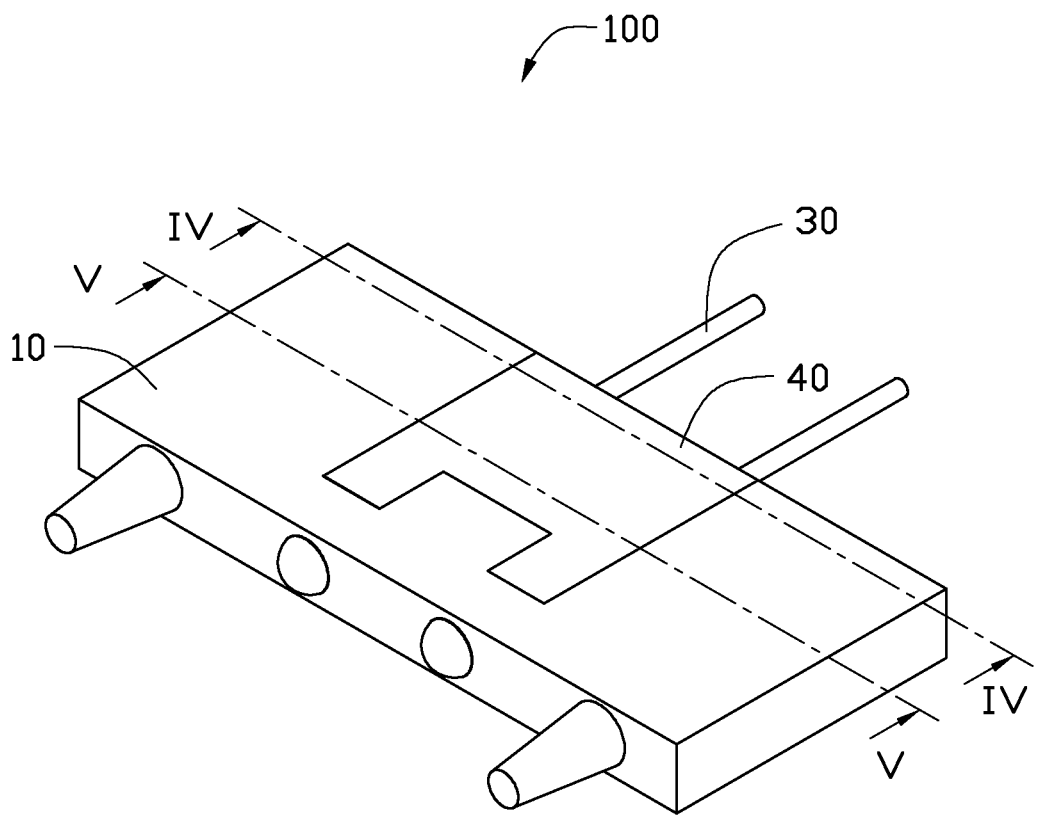
FIG. 1 is an isometric view of an optical fiber connector, according to an exemplary embodiment.

Referring to FIG. 1, an optical fiber connector 100, according to an exemplary embodiment, includes a connector body 10, two optical fibers 30, and a cover 40.

Figure 2:
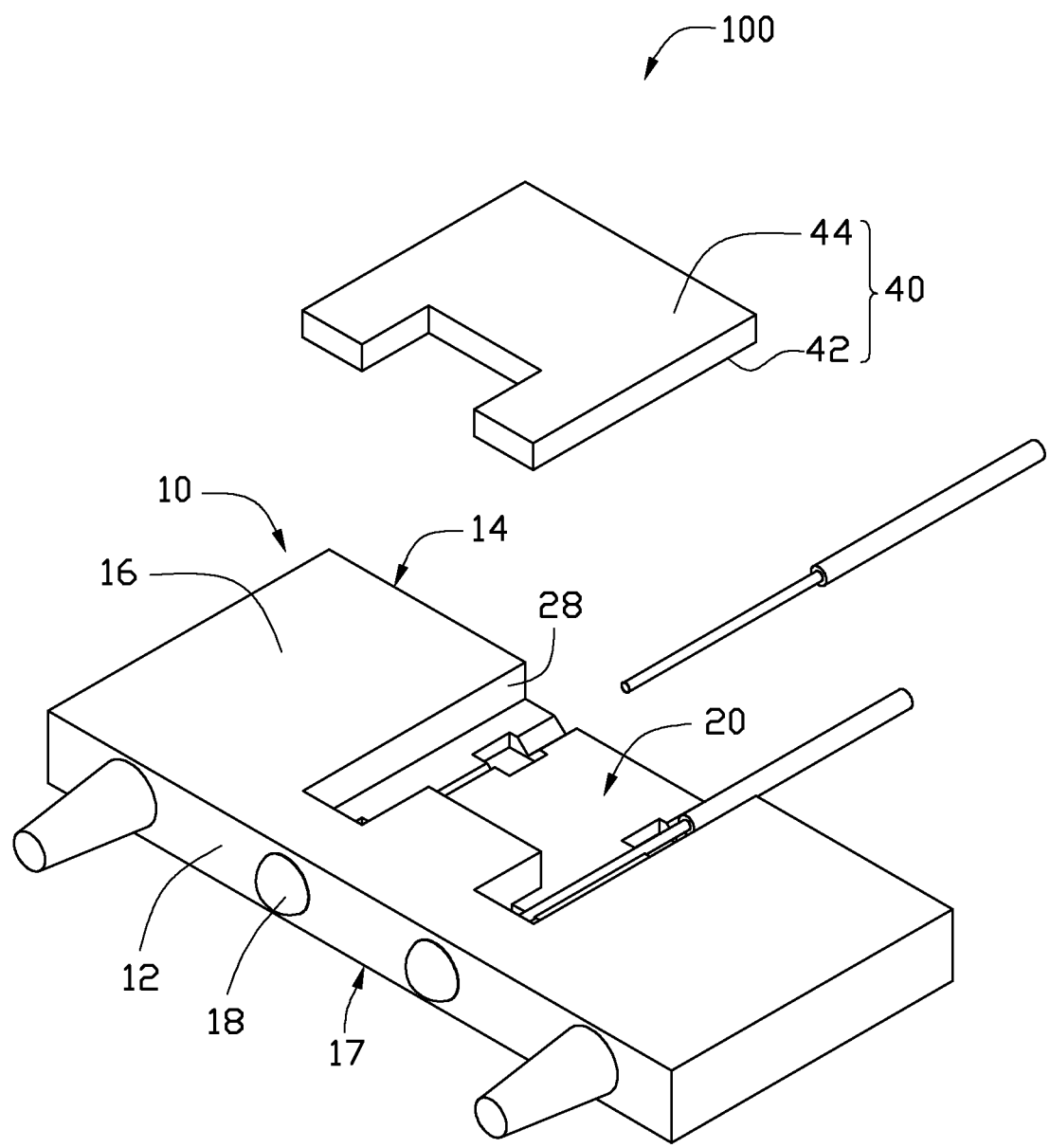
FIG. 2 is an exploded view of the optical fiber connector of FIG. 1.
Figure 3:
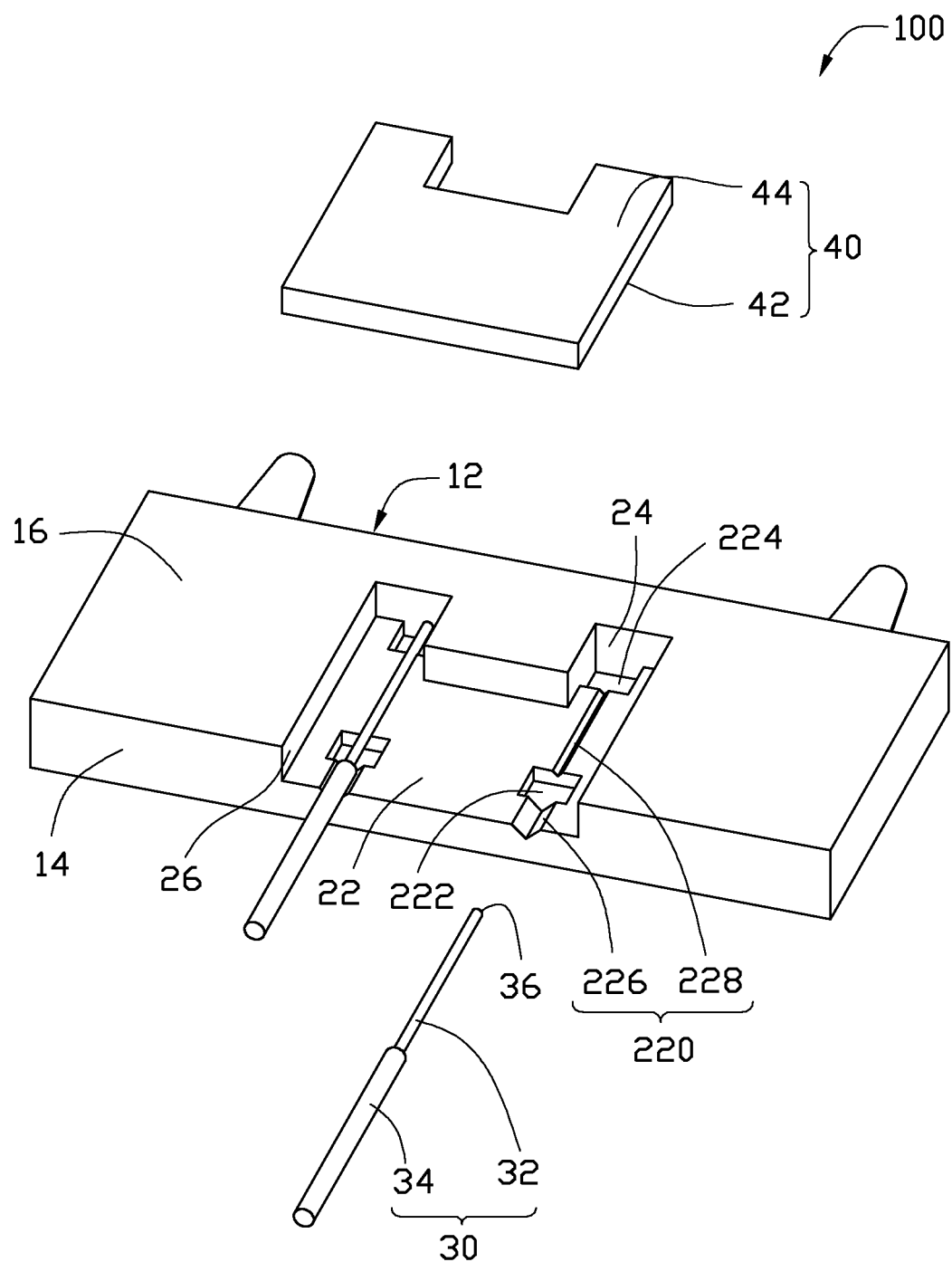
FIG. 3 is similar to FIG. 2, viewed from another aspect.

Referring to FIGS. 2-3, the connector body 10 is substantially cuboid and transparent. The connector body 10 includes a first side surface 12, a second side surface 14, an upper surface 16, a lower surface 17, and two optical lenses 18. The first side surface 12 is substantially parallel to the second side surface 14. The upper surface 16 is substantially parallel to the lower surface 17. The upper surface 16 and the lower surface 17 are perpendicularly interconnected between the first side surface 12 and the second side surface 14. The optical lenses 18 are formed on the first side surface 12.

The connector body 10 includes a top recess 20 defined in the upper surface 16, and a bottom surface 22, an inner front surface 24, a first inner side surface 26, and a second inner side surface 28. The bottom surface 22, the inner front surface 24, the first inner side surface 26, and the second inner side surface 28 form the boundaries of the top recess 20. The bottom surface 22 is substantially parallel to the upper surface 16. The inner front surface 24, the first inner side surface 26, and the second inner side surface 28 perpendicularly extend from three edges of the bottom surface 22 and terminate at the upper surface 16. The inner front surface 24 is substantially parallel to the first side surface 12 and has a certain distance from the first side surface 12. The first inner side surface 26 is substantially parallel to the second inner side surface 28. The bottom surface 22, the first inner side surface 26, and the second inner side surface 28 perpendicularly extend from the second side surface 14 and terminate at the inner front surface 24.

The bottom surface 22 defines two receiving grooves 220 for receiving the two optical fibers 30, which are interrupted by a first recesse 222, and by a second recesse 224. Each receiving groove 220 is aligned with, and communicates with, a first recess 222 and a second recess 224. Each receiving groove 220 includes a first receiving groove portion 226 and a second receiving groove portion 228. The first receiving groove portion 226, the first recess 222, the second receiving groove portion 228, and the second recess 224 are arranged in order from the second side surface 14 to the first side surface 12. The second recess 224 communicates with the second receiving groove portion 228 and is bounded by the inner front surface 24. In this embodiment, the first recesses 222 and the second recesses 224 are cuboid. The first recesses 222 are configured for receiving two first glue layers, and the second recesses 224 are configured for receiving two second glue layers. The material of the first glue layers is ultraviolet (UV) curable resin. The second glue layers are optical matching glue. The first receiving groove portions 226 and the second receiving groove portions 228 are V-shaped in cross-section. Each of the first receiving groove portions 226 includes a first slanted surface 226a and a second slanted surface 226b (shown in FIG. 4). Each of the second receiving groove portions 228 includes a third slanted surface 228a and a fourth slanted surface 228b (shown in FIG. 5). In this embodiment, each of the first receiving groove portions 226 are deeper and wider than the second receiving groove portions 228.

In another embodiment, the first recesses 222 and the second recesses 224 can be omitted. The receiving grooves 220 extend from the second side surface 14 to the inner side surface 24.

Each of the two optical fibers 30 is received in a receiving groove 220 and is aligned with an optical lens 18. Each optical fiber 30 includes a main portion 34 which is substantially circular in section, and a concentric front portion 32. The main portion 34 consists of a core portion and a cladding portion surrounding the core portion. The front portion 32 consists of the core portion exposed, and the front portion 32 has a certain critical length. The first receiving groove portion 226 conforms to the main portion 34 and is configured for receiving the main portion 34. The second receiving groove portion 228 is sized to match the front portion 32 and is configured for receiving the front portion 32.

The cover 40 is shaped to be received in the top recess 20 and may be attached to the connected body 10 in the top recess 20 with adhesive. The cover 40 may be made of a material which does not impede ultraviolet light so that ultraviolet light can be used to cure all the adhesives used. The cover 40 is inserted in the top recess 20, and the shape of the cover 40 is such as to prevent incorrect assembly. The insertion direction of the cover 40 is substantially perpendicular to a longitudinal axis of the receiving groove 220.

The cover 40 includes a first surface 42 and a second surface 44. The first surface 42 and the second surface 44 are positioned at opposite sides of the cover 40. When the cover 40 is in place, the first surface 42 is in contact with the bottom surface 22, and the second surface 44 is flush with the upper surface 16.

Figure 4:
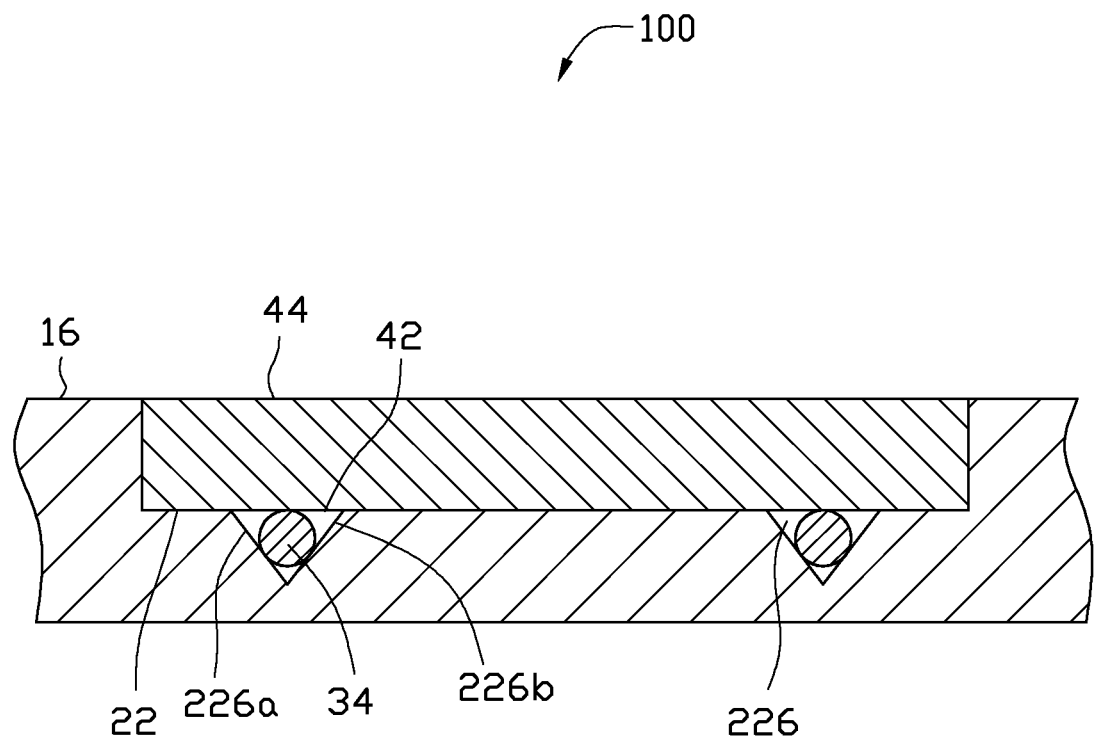
FIG. 4 is a sectional view of the optical fiber connector taken along line IV-IV of FIG. 1.

Referring to FIG. 4, the first surface 42, the first slanted surface 226a, and the second slanted surface 226b cooperatively and securely retain the main portion 34 of each of the optical fibers 30 in the connector body 10. In detail, a horizontal tangent across the outer circumference of the main portion 34 is coplanar with a horizontal tangent across the outer circumference of the front portion 32, and both tangents are coplanar with the first surface 42 of the cover 40.

Figure 5:
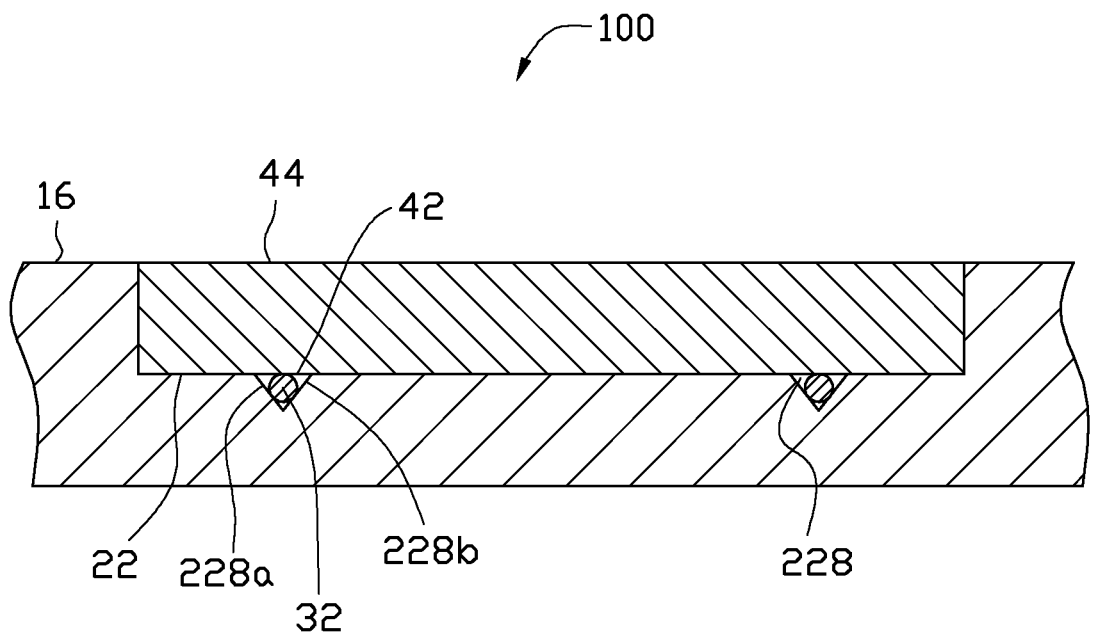
FIG. 5 is a sectional view of the optical fiber connector taken along line V-V of FIG. 1.

Referring to FIG. 5, the first surface 42, the third slanted surface 228a, and the second slanted surface 228 cooperatively and securely retain the front portion 32 of each of the optical fibers 30 in the connector body 10.

When the optical fibers 30 are assembled into the connector body 10, the optical fibers 30 are received in the respective receiving grooves 220. In particular, each main portion 34 is received in the first receiving groove portion 226, each front portion 32 is received in the second receiving groove portion 228, and a distal end surface 36 of the optical fiber 30 contacts the inner front surface 24 to coincide with the focal plane of the optical lens 18. The second glue layers then fill the second recesses, and the first glue layers fill the first recesses. Finally, the cover 40 is inserted into the top recess 20, the first surface 42, the first slanted surface 226a, and the second slanted surface 226b cooperatively and securely retain the main portion 34 of each of the optical fibers 30 in the top recess 20, and the first surface 42, the third slanted surface 228a, and the second slanted surface 228 cooperatively and securely retain the front portion 32 of each of the optical fibers 30 in the top recess 20, thereby the optical fibers 30 are fixed in the connector body 10.

The slanted surfaces 226a, 226b, 228a, and 228b can be made as through holes or as blind holes, thus making it is easier (without blind holes) to mold the connector body 10 to the desired tolerances with the receiving grooves 220 and the cover 40 than molding a body with blind holes to the desired tolerances.

Abutting the distal end surface 36 of the optical fiber 30 against the inner front surface 24, so as to ensure a precise spatial coincidence between the distal end surface 36 and the focal plane of the optical lens 18, is an assurance of data transmission accuracy.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An optical fiber connector, comprising:
a plurality of optical fibers, each optical fiber comprising a main portion consisting of a core portion and a cladding portion surrounding the core portion, and a front portion consisting of an exposed core portion proximate to the main portion;
a connector body comprising a first side surface, an opposing second side surface parallel to the first side surface, an upper surface perpendicularly interconnected between the first side surface and the second side surface, and a plurality of optical lenses arranged at the first side surface, the connector body including a top recess defined in the upper surface, and a bottom surface in the top recess parallel to the upper surface, the bottom surface defining a plurality of receiving grooves, each of the receiving grooves having a V-shaped cross-section and two slanted surfaces, each receiving groove comprising a first receiving groove portion for receiving the main portion and a second receiving groove portion for receiving the front portion, the first receiving groove portion and the second receiving groove portion arranged in that order along a direction from the second side surface to the first side surface, the optical fibers received in the respective receiving grooves and aligned with the respective optical lenses; and
a cover engagingly received in the top recess, the cover comprising a first surface and a second surface opposite to the first surface, the first surface and the slanted surfaces of the receiving grooves cooperatively securely retaining the optical fibers in the top recess of the connector body.

2. The optical fiber connector as claimed in claim 1, wherein a horizontal tangent across the outer circumference of the main portion is coplanar with a horizontal tangent across the outer circumference of the front portion, and both tangents are coplanar with the first surface of the cover.

3. The optical fiber connector as claimed in claim 2, wherein the connector body further comprises an inner front surface in the top recess parallel to the first side surface, a first inner side surface in the top recess, and a second inner surface in the top recess parallel to the first inner side surface, the inner front surface perpendicularly connects the first inner side surface to the second inner side surface, and each of the bottom surface, the first inner side surface, and the second inner side surface extends from the second side surface toward and terminates at the inner front surface.

4. The optical fiber connector as claimed in claim 3, wherein the bottom surface further defines a plurality of first recesses and a plurality of second recesses, each first recess is located between the second side surface and the corresponding second recess and is connected with the corresponding receiving groove, each second recess is arranged at a distal end of the corresponding receiving groove and is bounded by the inner front surface, the first recesses are configured for receiving first glue layers, and the second recesses are configured for receiving second glued layers.

5. The optical fiber connector as claimed in claim 4, wherein a distal end surface of each optical fiber contacts the inner front surface and coincides with the focal plane of the corresponding optical lens.

6. The optical fiber connector as claimed in claim 4, wherein the first glue layers are ultraviolet curable resin, and the second glue layers are optical matching glue.

7. The optical fiber connector as claimed in claim 1, wherein the cover is made of material transparent to ultraviolet light.

* * * * *